US 8,988,358 B2

(12) United States Patent
Medler et al.

(10) Patent No.: US 8,988,358 B2
(45) Date of Patent: Mar. 24, 2015

(54) INPUT DEVICE FOR A MOTOR VEHICLE

(75) Inventors: Andreas Medler, Lengede (DE); Ulrike Wehling, Braunschweig (DE); Alf Pollex, Wolfenbüttel (DE); Dino Göhler, Berlin (DE); Jan Michaelis, Berlin (DE); Rainer Dehmann, Berlin (DE); Kyoung Sun Han, Berlin (DE)

(73) Assignee: Volkswagen AG, Wolfsburg (DE)

( * ) Notice: Subject to any disclaimer, the term of this patent is extended or adjusted under 35 U.S.C. 154(b) by 859 days.

(21) Appl. No.: 11/544,524

(22) Filed: Oct. 5, 2006

(65) Prior Publication Data

US 2007/0146342 A1    Jun. 28, 2007

(30) Foreign Application Priority Data

Oct. 5, 2005   (DE) .................... 10 2005 047 648

(51) Int. Cl.
  *G06F 3/041*  (2006.01)
  *G01C 21/36*  (2006.01)
  *G06F 3/0488*  (2013.01)

(52) U.S. Cl.
  CPC .......... *G01C 21/3664* (2013.01); *G06F 3/0488* (2013.01)
  USPC ....................................................... 345/173

(58) Field of Classification Search
  CPC ... G06F 3/0488; G06F 3/04886; G06F 3/016; G06F 3/044; G06F 3/03547; G06F 3/041; G06F 3/0416; G06F 3/04842; B60K 2350/1024; B60K 2350/1028; B60K 2350/1004; B60K 2350/925; B60K 37/06; G01C 21/3664; G01C 21/3682; B60R 11/0235
  USPC ................ 345/156, 168, 169, 173; 178/18.01
  See application file for complete search history.

(56) References Cited

U.S. PATENT DOCUMENTS

| | | | | |
|---|---|---|---|---|
| 5,757,359 A | * | 5/1998 | Morimoto et al. | 345/156 |
| 6,067,081 A | * | 5/2000 | Hahlganss et al. | 345/173 |
| 6,278,443 B1 | * | 8/2001 | Amro et al. | 345/173 |
| 6,687,614 B2 | * | 2/2004 | Ihara et al. | 701/209 |
| 6,974,414 B2 | | 12/2005 | Victor | |
| 7,002,556 B2 | * | 2/2006 | Tsukada et al. | 345/173 |
| 2002/0122029 A1 | * | 9/2002 | Murphy | 345/173 |

(Continued)

FOREIGN PATENT DOCUMENTS

| | | |
|---|---|---|
| DE | 201 02 197 | 6/2001 |
| DE | 102 18 340 | 11/2003 |

(Continued)

OTHER PUBLICATIONS

"Mitsubishi Electric Develops Ultra-Simple HMI for In-Car Device Operation", Mitsubishi Electric Corporation, Tokyo, Feb. 10, 2014.

(Continued)

*Primary Examiner* — Stephen Sherman
(74) *Attorney, Agent, or Firm* — Kenyon & Kenyon LLP (57) ABSTRACT

An input device, e.g., for a motor vehicle, includes a display for displaying variable information, and a touch screen, disposed above the display, for inputting instructions by touching the touch screen, and the input device including a control system for generating a selection marking displayable on the display, and for displacing the selection marking displayed by the display according to a touching motion across the touch screen.

12 Claims, 6 Drawing Sheets

(56) References Cited

U.S. PATENT DOCUMENTS

2002/0158846 A1* 10/2002 Clapper .................. 345/168
2005/0234617 A1    10/2005 Kynast et al.

FOREIGN PATENT DOCUMENTS

EP      0 795 811      9/1997
EP      1 560 102      8/2005

OTHER PUBLICATIONS

"Visual-Manual NHTSA Drive Distraction Guidelines for In-Vehicles Electronic Devices", Department of Transportation, National Highway Traffic Safety Administration.

* cited by examiner

INPUT DEVICE FOR A MOTOR VEHICLE

CROSS-REFERENCE TO RELATED APPLICATIONS

This application claims priority to Application No. 10 2005 047 648.1, filed in the Federal Republic of Germany on Oct. 5, 2005, which is expressly incorporated herein in its entirety by reference thereto.

FIELD OF THE INVENTION

The present invention relates to an input device, e.g., for a motor vehicle, the input device having a display for displaying variable information, e.g., to display a map, and a touch screen, disposed above the display, to input instructions by touching the touch screen or by pressing on the touch screen.

BACKGROUND INFORMATION

German Published Patent Application No. 201 02 197 describes a touch screen for visually representing electronic signals and for inputting signs and symbols by touching the screen for confirmation purposes, the touch screen including a functional plane for visual representation and keystroke input and a higher-level protective plane corresponding thereto that is deformable at certain points. When certain points of the functional plane are selected by touching contact across the protective plane, at least one confirmation signal is generated so as to be perceptible for the user's sense oft touch (haptic stimulus), at the position of the point of contact in the deformed protective plane, and the confirmation signal for the sense of touch (haptic stimulus) is generated by vibration elements eccentrically positioned within and/or underneath the functional plane. In addition, in the touch screen described in German Published Patent Application No. 201 02 197, the generated vibrations are transmitted from the functional plane to the protective plane as the result of direct contacting of the two planes and/or via the edge regions of the planes by rigid or elastic connecting elements.

SUMMARY

Example embodiments of the present invention provide an input device, e.g., for a motor vehicle, which may improve the operation of a navigation system of a motor vehicle.

According to an example embodiment of the present invention, an input device, e.g., for a motor vehicle, includes a display for displaying variable information, and a touch screen, disposed above the display, for inputting instructions by touching the touch screen, and the input device including a control system for generating a selection marking displayable on the display and for displacing the selection marking displayed by the display according to a touching motion across the touch screen. Touching of the touch screen may also, or only, be pressing on the touch screen.

It may be provided that a touch screen also is configured for the optical display of information, i.e., it includes a touch screen and a display. According to this aspect of a touch screen, no further display needs to be provided. Instead, a touch screen in this context already includes a display.

The selection marking may be displaceable only if the touching motion originates in the region of the selection marking or extends through the selection marking. For example, it is provided that the selection marking is displaced according to the touching motion only after it has passed through the region of the selection marking.

An operating element to cell up the selection marking may be displayable by the display.

The selection marking may include a cross, cross hairs, a circle, a ring, an arrow and/or a pointer, etc., or may be made up of a cross, cross hairs, a circle, a ring, an arrow or a pointer, etc.

The input device may include an actuator for deflecting the touch screen when the selection marking attains a predefined position and/or is moved a predefined distance. For example, it may be provided that the actuator is controllable by the control system to deflect the touch screen. The deflection may end after a specific period of time, e.g., after 20 ms to 200 ms. A predefined position may be, for example, a small town, a street, a building and/or a POI (point of interest), etc. Upon deflection of the touch screen, when the selection marking is moved a predefined distance, it may be provided, for example, that the touch screen is deflected anew or is able to be deflected when the selection marking is moved by the substantially integral multiple of the predefined distance. For example, if a deflection after, e.g., 3 mm is provided (as defined distance), then a deflection will occur also after 6 mm, after 9 mm, after 12 mm, after 15 mm, etc.

A navigation system for a motor vehicle may include a previously mentioned input device. The information displayable on the display may include a map or a map detail.

According to a method for operating an input device, e.g., including one or a plurality of the aforementioned features, the input device having a display to display variable information, and a touch screen, disposed above the display, to input instructions by touching the touch screen, a selection marking being displayed with the aid of the display, and the selection marking displayed by the display being displaced according to a touching motion across the touch screen.

The selection marking may be displaced only if the touching motion originates in the region of the selection marking or extends through the selection marking.

A motor vehicle may include, e.g., a land vehicle that may be used individually in road traffic. Motor vehicles, however, are specifically not restricted to land vehicles having an internal combustion engine.

Further aspects and features of example embodiments of the present invention are described in more detail below with reference to the appended Figures.

DETAILED DESCRIPTION

Figure 1:
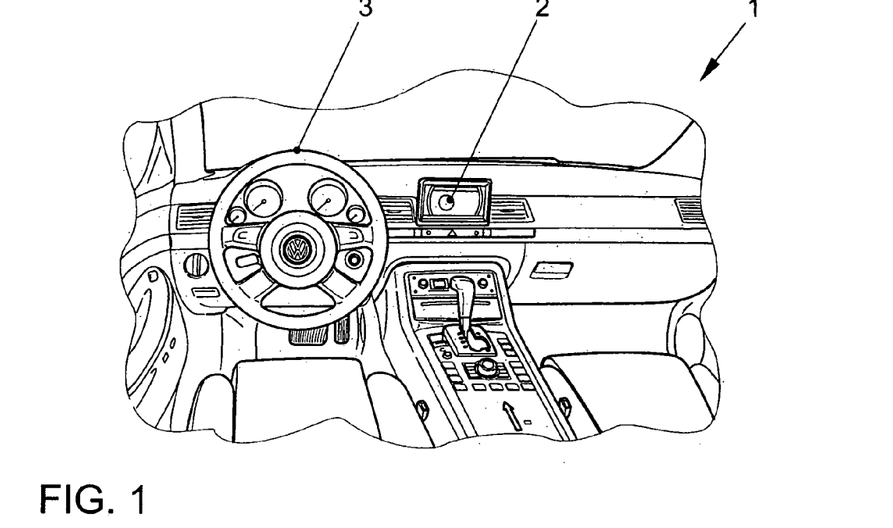
FIG. 1 is an interior view of a motor vehicle.
Figure 2:
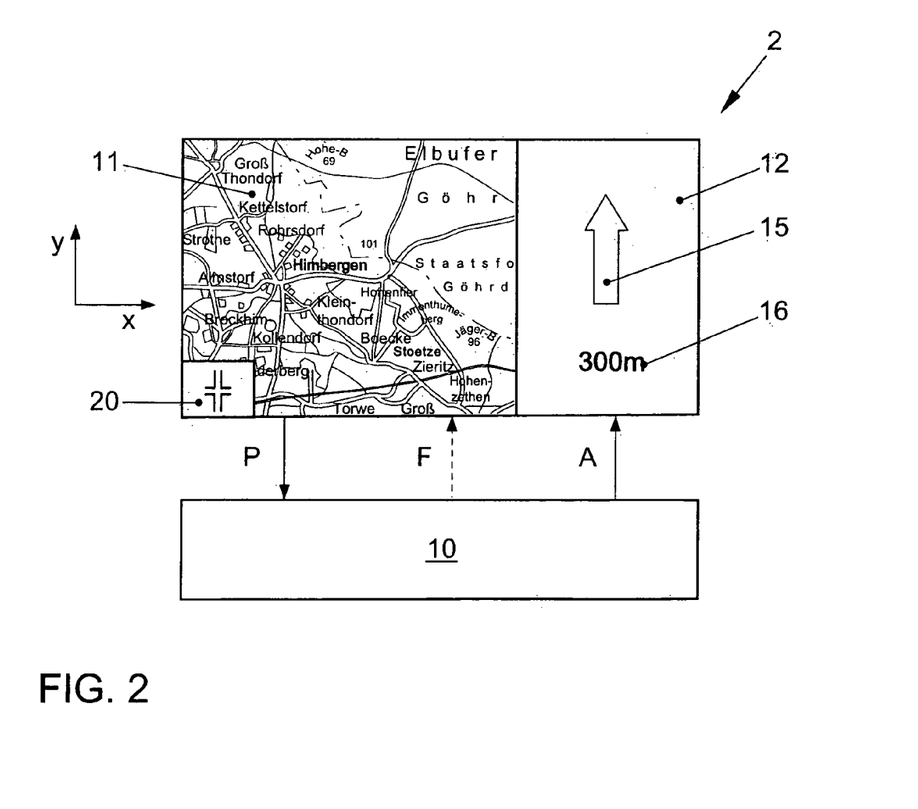
FIG. 2 illustrates an input device having a control system.

FIG. 1 is an interior view of a motor vehicle denoted by reference numeral 1. Motor vehicle 1 includes an input device 2 having a display for displaying variable information, e.g., for displaying a map, and a touch screen, disposed above the display, for inputting instructions by touching the touch screen or by pressing on the touch screen. In FIG. 2, the display displays an input mask for a navigation system. This exemplary input mask includes a map 11, a region 12 having navigation symbols 15 and 16, and an operating element 20 to call up a selection marking. Input device 2 may also be integrated in a steering wheel 3 illustrated in FIG. 1.

Input device 2 includes a control system 10 for controlling input device 2. To this end, it is provided that control system 10 outputs to the display a display signal A to generate a desired display of the variable information, such as map 11, navigation symbols 15 and 16, or operating element 20, on the display. In addition, control system 10 reads in a positional signal P, which indicates the coordinates x and y of a touching motion of the touch screen (or pressing on the touch screen).

It may be provided that input device 2 is configured to output haptic feedback as described, for example, in European Published Patent Application No. 1 560 102, which is expressly incorporated herein in its entirety by reference thereto. Control system 10 outputs a force control signal F to an actuator to generate the haptic feedback.

Figure 3:
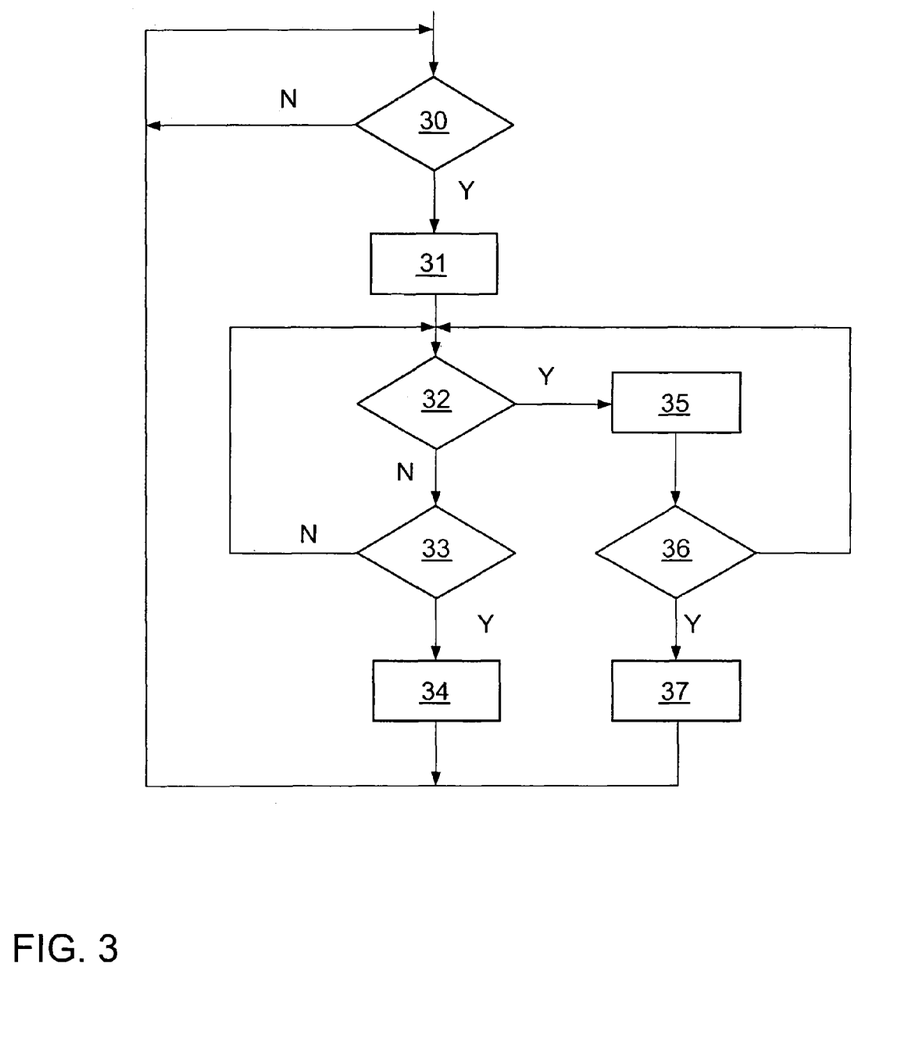
FIG. 3 illustrates a method implemented in the control system illustrated in FIG. 2.
Figure 4:
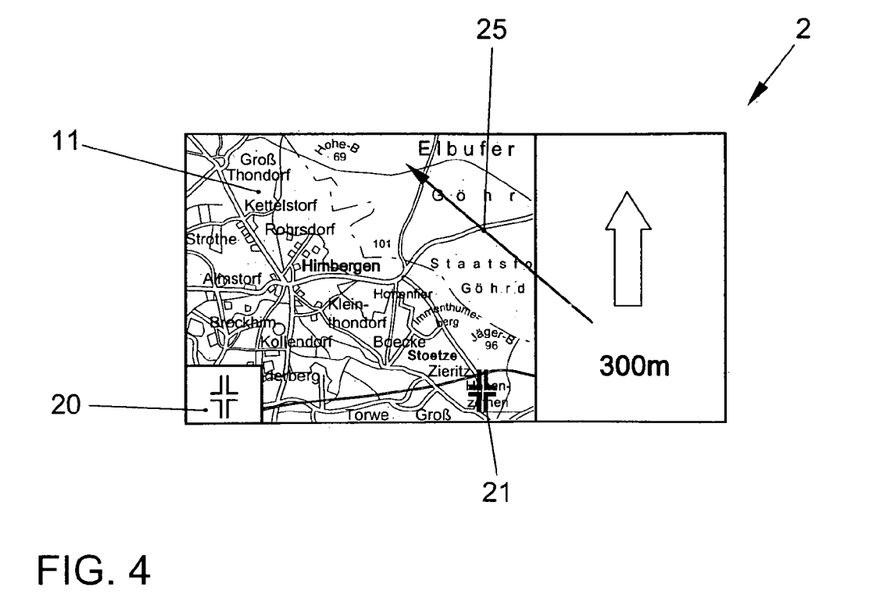
FIG. 4 illustrates the input device illustrated in FIG. 2.

FIG. 3 illustrates a method implemented in control system 10 (described with reference to FIG. 2, FIG. 4, FIG. 5 and FIG. 6) according to which a selection marking 21 displayed by the display is displaced according to a touching motion across the touch screen. The method begins with a query 30 as to whether the touch screen has been touched in the region of operating element 20. If the touch screen has been touched in the region of operating element 20, a selection marking 21 is generated or displayed in a step 31, as illustrated in FIG. 4, for example. Otherwise, query 30 will be repeated.

Step 31 is followed by a query 32 as to whether a touching motion across the touch screen is taking place. If no touching motion across the touch screen is taking place, query 32 is followed by a query 33 as to whether the touch screen has been touched in the region of operating element 20. If the touch screen has been touched in the region of operating element 20, selection marking 21 is removed in step 34. Step 34 is followed by query 30.

Figure 5:
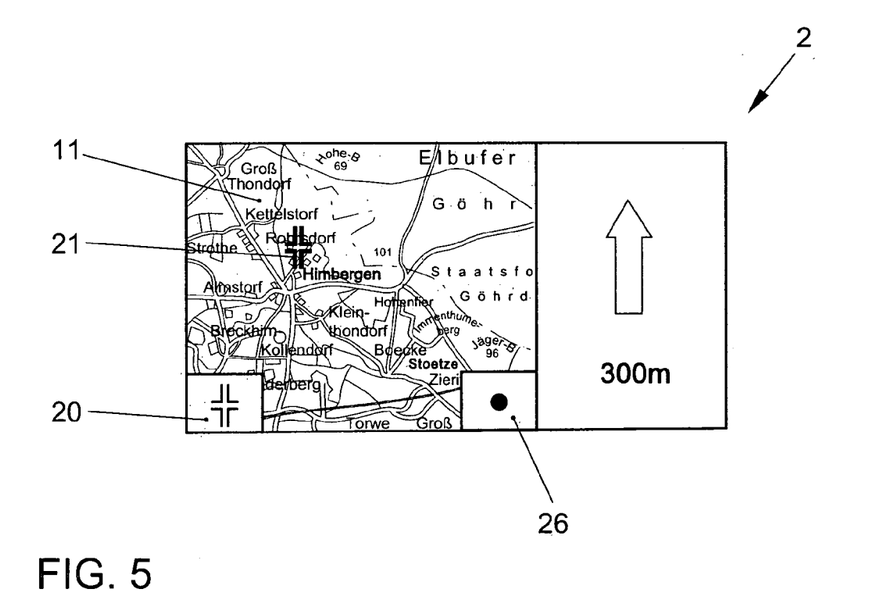
FIG. 5 illustrates the input device illustrated in FIG. 2.

If the touch screen has not been touched in the region of operating element 20, query 33 is followed by query 32 as to whether a touching motion across the touch screen has taken place. If a touching motion across the touch screen is taking place, as represented in FIG. 4 by an arrow bearing reference numeral 25, for example, query 32 is followed by a step 35 in which selection marking 21 displayed by the display, as illustrated in FIG. 5, is displaced according to a touching motion across the touch screen, and in which an operating element 26 for selecting a destination marked with the aid of selection marking 21 is displayed. According to the example illustrated in FIG. 4, selection marking 21 is displaced according to a touching motion across the touch screen, regardless of the location of this touching motion. Selection marking 21 may be displaceable only if the touching motion originates in the region of selection marking 21 or extends through selection marking 21. According to the latter, it is provided, for example, that selection marking 21 is displaced according to the touching motion only after passing through the region of selection marking 21.

Step 35 is followed by a query 36 as to whether the touch screen has been touched in the region of operating element 26. If the touch screen has been touched in the region of operating element 26, a destination marked by selection marking 21 is selected in a step 37, and selection marking 21 and operating element 26 are removed. Step 37 is followed by query 30. However, if the touch screen has not been touched in the region of operating element 26, then query 32 follows query 36.

Figure 6:
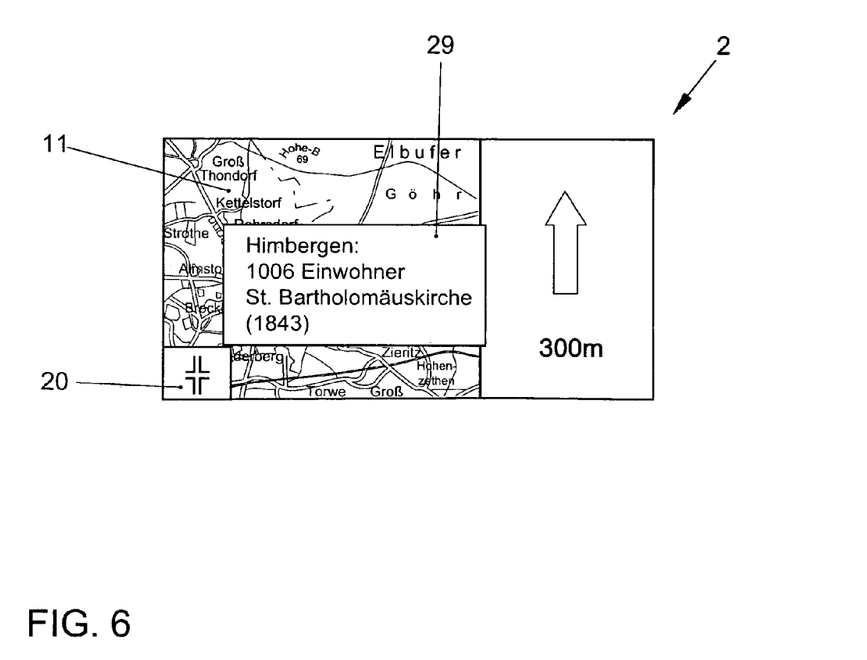
FIG. 6 illustrates the input device illustrated in FIG. 2.
Figure 7:
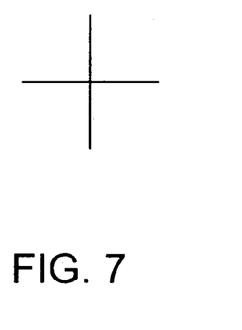
FIG. 7 illustrates an exemplary embodiment of a selection marking.
Figure 8:
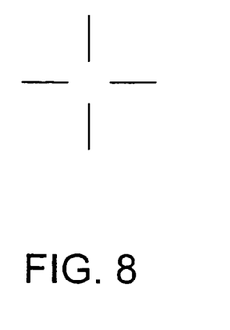
FIG. 8 illustrates an exemplary embodiment of a selection marking.
Figure 9:
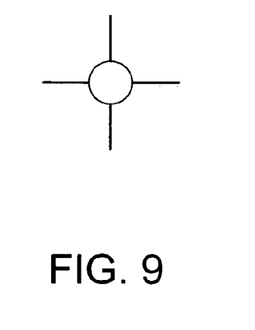
FIG. 9 illustrates an exemplary embodiment of a selection marking.
Figure 10:
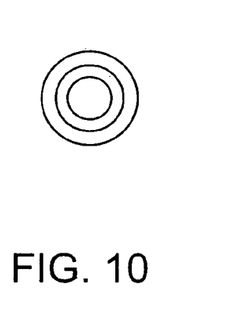
FIG. 10 illustrates an exemplary embodiment of a selection marking.
Figure 11:
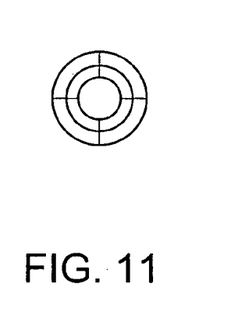
FIG. 11 illustrates an exemplary embodiment of a selection marking.
Figure 12:
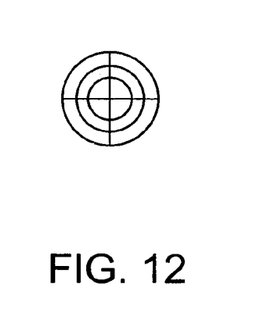
FIG. 12 illustrates an exemplary embodiment of a selection marking.
Figure 13:
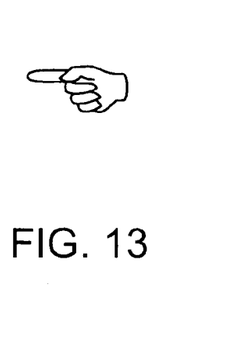
FIG. 13 illustrates an exemplary embodiment of a selection marking.
Figure 14:
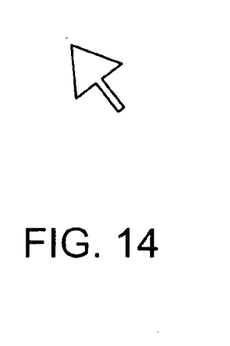
FIG. 14 illustrates an exemplary embodiment of a selection marking.

The selection of a destination marked by selection marking 21 may mean, for example, that this destination is input as starting or end point of a route. However, the selection of a destination marked by selection marking 21 may additionally or alternatively also mean that information with reference to this destination is output. For example, as illustrated in FIG. 6, this may be done by a superimposed information field 29.

The method described with reference to FIG. 3 is merely an example. It may also be provided that selection marking 21 is automatically superposed whenever this function is offered. It may also be provided that the selection of a destination marked by selection marking 21 may be made, or is made, by touching selection marking 21, e.g., a touching of selection marking 21 that lasts longer than a limit value.

As illustrated in FIG. 2, FIG. 4, FIG. 5 and FIG. 6, selection marking 21 may be configured in the form of a cross. Alternatively, the selection marking may include cross hairs, a circle, a ring, an arrow and/or a pointer, etc., or is made up of cross hairs, a circle, a ring, an arrow, or a pointer, etc. FIG. 7, FIG. 8, FIG. 9, FIG. 10, FIG. 11, FIG. 12, FIG. 13, FIG. 14 and FIG. 15 illustrate possible arrangements of a selection marking. It may be provided that an operator is able to choose between different forms of selection markings.

Figure 15:
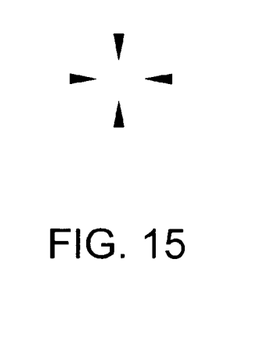
FIG. 15 illustrates an exemplary embodiment of a selection marking.
Figure 16:
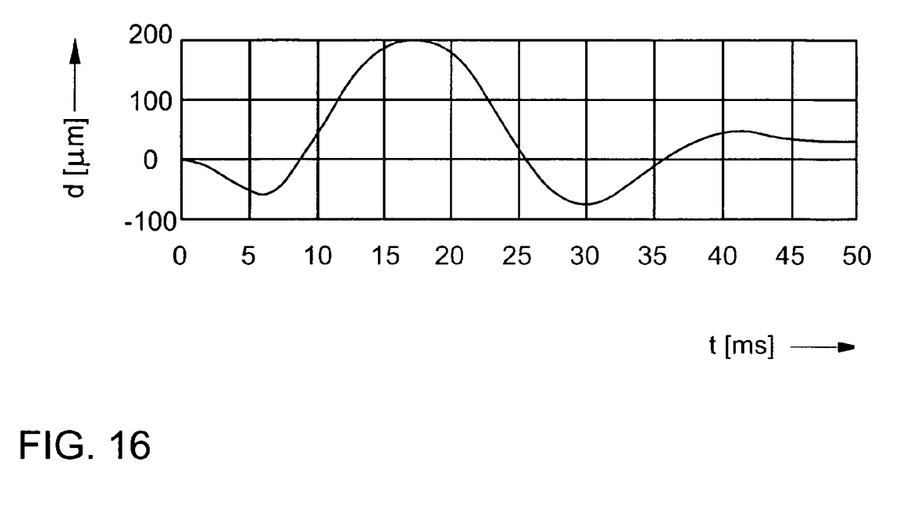
FIG. 16 illustrates a deflection of a touch screen.

Input device 2 has an actuator to deflect the touch screen when the selection marking attains a predefined position and/or is displaced a predefined distance. For example, it may be provided that the actuator is controllable with the aid of control system 10 so as to deflect the touch screen, as illustrated in FIG. 15, for example. Reference character d denotes the deflection in the x-direction, and t denotes the time.

LIST OF REFERENCE NUMERALS 1 motor vehicle
2 input device
3 steering wheel
10 input control system
11 map
12 region
15, 16 navigation symbol
20, 26 operating element
21 selection marking
25 arrow
29 information field
30, 32, 33, 36 query
31, 33, 34, 35, 37 step
A display signal
d deflection of a touch screen
F force control signal
p positional signal
t time
y x coordinate

What is claimed is:

1. An input device, comprising:
- a display, in a motor vehicle, adapted to display variable information relating to navigation of the motor vehicle;
- a touch screen arranged above the display and adapted to input instructions by touch of the touch screen by a vehicle operator; and
- a control system adapted: (a) to generate an operating element and display the operating element on the display; (b) to receive an indication of a touch on the touch screen in a region of the operating element displayed on the display, and, in response to the indication, to generate a selection marking and, further in response to the indication, to display the selection marking on the display in a region of the display (i) remote from the region of the operating element and (ii) remote from the touch on the touch screen; and (c) to move the selection marking displayed by the display in accordance with a touch motion across the touch screen.

2. The input device according to claim 1, wherein the display is adapted to display an operating element to call up the selection marking.

3. The input device according to claim 1, wherein the selection marking includes at least one of (a) a cross, (b) a circle, (c) a ring, (d) an arrow and/or (e) a pointer.

4. The input device of claim 1, wherein the information includes at least one of (a) a map, (b) a map detail, and/or (c) a navigation symbol.

5. The input device of claim 1, wherein the control system is further adapted to read a position signal indicating the coordinates of at least one of (i) the touch on the touch screen and/or (ii) the touch motion across the touch screen.

6. The input device of claim 1, the control system further adapted to move the selection marking displayed by the display regardless of the location of the touch motion across the touch screen.

7. The input device of claim 1, the control system further adapted to generate a second operating element and display the second operating element on the display.

8. The input device of claim 7, the control system further adapted, in response to a second action comprising a touch on the touch screen in a region of the second operating element, to generate an indication of a location of the selection marking as at least one of (i) a starting point and/or (ii) an end point of the route.

9. The input device of claim 7, the control system further adapted, in response to a second action comprising a touch on the touch screen in a region of the second operating element, to output information related to a location of the selection marking, for display on the display.

10. A navigation system for a motor vehicle, comprising:
an input device including:
- a display, in a motor vehicle, adapted to display variable information relating to navigation of the motor vehicle;
- a touch screen arranged above the display and adapted to input instructions by touch of the touch screen by a vehicle operator; and
- a control system adapted: (a) to generate an operating element and display the operating element on the display; (b) to receive an indication of a touch on the touch screen in a region of the operating element displayed on the display, and, in response to the indication, to generate a selection marking and, further in response to the indication, to display the selection marking on the display in a region of the display (i) remote from the region of the operating element and (ii) remote from the touch on the touch screen; and (c) to move the selection marking displayed by the display in accordance with a touch motion across the touch screen.

11. The navigation system according to claim 10, wherein the information includes at least one of (a) a map, (b) a map detail, and/or (c) a navigation symbol.

12. A method for operating an input device, comprising:
- displaying on a display variable information relating to navigation of the motor vehicle, including an operating element;
- receiving instructions input by a vehicle operator on a touch screen by touching the touch screen, the touch screen arranged above the display;
- in response to an indication of a touch on the touch screen in a region of the operating element, displaying a selection marking by the display in a region of the display (i) remote from the region of the operating element and (ii) remote from the touch on the touch screen; and
- moving the selection marking displayed by the display in accordance with a touching motion across the touch screen.

* * * * *